US007650631B2

(12) United States Patent
Lee et al.

(10) Patent No.: US 7,650,631 B2
(45) Date of Patent: Jan. 19, 2010

(54) METHOD FOR VERIFYING AUTHORIZATION WITH EXTENSIBILITY IN AAA SERVER

(75) Inventors: Byung Gil Lee, Daejeon (KR); Hyun Gon Kim, Daejeon (KR); Kyo Chung, II, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 763 days.

(21) Appl. No.: 11/099,338

(22) Filed: Apr. 4, 2005

(65) Prior Publication Data
US 2006/0123469 A1    Jun. 8, 2006

(30) Foreign Application Priority Data
Dec. 7, 2004  (KR) ............... 10-2004-0102283

(51) Int. Cl.
*H04L 9/32* (2006.01)
*G06K 9/00* (2006.01)
*G06F 17/30* (2006.01)

(52) U.S. Cl. ............... 726/4; 726/5; 726/8; 726/16; 726/21; 726/28; 713/168; 713/153; 713/156

(58) Field of Classification Search ............... 726/4, 726/5, 8, 16, 21, 28, 29, 30; 713/153, 156, 713/168

See application file for complete search history.

(56) References Cited

U.S. PATENT DOCUMENTS

| 7,228,133 B2* | 6/2007 | Rink et al. .......... 455/433 |
| 2006/0015724 A1* | 1/2006 | Naftali et al. .......... 713/168 |
| 2007/0005954 A1* | 1/2007 | Skemer .......... 713/153 |

FOREIGN PATENT DOCUMENTS

KR   1020010091169 A   10/2001

OTHER PUBLICATIONS

"A Study of AAA Implementation based on the PKI for the Mobile Networks", G. Kim, et al., Dept. of Electrical & Electronic Engineering, JCCI 2002, 5 pages.
"AAA: A Survey and a Policy-Based Architecture and Framework" by Christoph Rensing, et al.; *IEEE Network*; Nov./Dec. 2002; pp. 22-27.

* cited by examiner

*Primary Examiner*—Jung Kim
*Assistant Examiner*—Izunna Okeke
(74) *Attorney, Agent, or Firm*—Blakely, Sokoloff, Taylor & Zafman

(57) ABSTRACT

A method for verifying authorization with extensibility in an authentication, authorization, and accounting (AAA) server, and more particularly, a method for verifying authorization in an AAA server capable of uniformly performing an authorization verification function regardless of a variety of authorization verification methods required for a user service provided through a network is provided. The method for verifying authorization with extensibility in an AAA server includes: the AAA server performing user authentication, transmitting the authentication result data to the user, and requesting authorization information for a subscriber service desired to be used, to the user; the user transferring an extensible authorization verification protocol framework having a predetermined format according to an AAA protocol to the AAA server, and requesting verification of the requested authorization; the AAA server verifying whether or not the authorization requested to be verified is set for the user, by referring to the framework; and if the authorization is verified, the AAA server transmitting the authorization verification result to the user, and by allocating a resource related to the authorization, beginning to provide the subscriber service.

5 Claims, 6 Drawing Sheets

| TYPE | CODE |
|---|---|
| IDENTITY | 1 |
| ... | ... |
| AUTHORIZATION | 100 |

| AUTHORIZATION TYPE | CODE |
|---|---|
| EAP APPLICATION | 1 |
| NASEREQ APPLICATION | 2 |
| MOBILE IP APPLICATION | 3 |
| CREDIT CONTROL APPLICATION | 4 |
| QoS APPLICATION | 5 |
| VPN APPLICATION | 6 |
| ... | ... |

METHOD FOR VERIFYING AUTHORIZATION WITH EXTENSIBILITY IN AAA SERVER

This application claims the priority of Korean Patent Application No. 10-2004-0102283, filed on Dec. 7, 2004, in the Korean Intellectual Property Office, the disclosure of which is incorporated herein in its entirety by reference.

BACKGROUND OF THE INVENTION

1. Field of the Invention

The present invention relates to a method for verifying authorization with extensibility in an authentication, authorization, and accounting (AAA) server, and more particularly, to a method for verifying authorization in an AAA server capable of uniformly performing an authorization verification framework regardless of a variety of authorization verification methods required for a user service provided through a network.

The fields to which the present invention is applied include wired applications, and also include where a service providing authentication, authorization, and accounting is implemented when a predetermined service is received by accessing a network of a service provider of a mobile communication system such as cellular, personal communication system (PCS), International Mobile Telecommunication 2000 (IMT-2000), mobile Internet, wireless local area network (WLAN) systems, and so on, and when a user moves into another domain and wants to receive a mobile roaming service.

2. Description of the Related Art

Authentication, authorization and accounting (AAA) means subscriber authentication, authorization verification and accounting functions required when a user wants to receive a predetermined service through a network.

The strongest point of mobile communication is that it enables to communicate with anybody wherever and whenever through a roaming function and a hand-off function. When this roaming or hand-off function uses an IP-based wireless Internet, IP allocation is required and a mobile IP protocol is used. For this, currently, mobile IP of and Sea-Moby WG of the Internet engineering task force (IETF) is addressing many issues such as mobile network security, fast hand-off support, and context transmission.

In a mobile communication environment supporting a mobile IP, when roaming, a mobile communication user uses a dual mode mobile phone or PDA to automatically select and/or access a wireless LAN public network or a mobile communication network. In order to receive a wireless Internet service, the user should be authenticated in a visited network and allocated an IP. Also, for accounting of the user's using the service, a predetermined accounting method is applied between the home network and the visited network, and in order to authorize the roaming user, a predetermined authorization setting method is applied. At this time, as an identifier (ID) to distinguish the user or mobile terminal, network access identifier (NAI) expressed in the form of user@realm is applied. Heterogeneous networks parse the NAI, distinguishes the home network of the user, and performs user authentication, authorization verification, and accounting functions.

In order to implement the AAA protocol, remote access dial in user service (RADIUS) protocol is used in the conventional technology. However, since the protocol is simply for a small-sized network supporting a small number of subscribers requiring server-based authentication, there is a drawback that the protocol is not appropriate to the AAA service for communication companies that should support hundreds to thousands of users at the same time. Also, the AAA should be supported safely among Internet service providers (ISPs) in a manner that the capacity can be expanded, but the RADIUS cannot satisfy this. Accordingly, in order to solve these problems, a protocol, a Diameter protocol, has been developed.

The Diameter protocol is an extensible peer-based AAA protocol to provide the AAA service for new policies, conventional technologies such as a point-to-point protocol (PPP), and new technologies such as roaming and mobile IP. The Diameter protocol supports a longer attribute/value length and a diameter server supports window communication based transport that can transmit messages enough to be processed by a network access server (NAS), and is reliable enough to prepare failures.

While the RADIUS server does not transmit a message if an AAA client that is an intermediate server does not request it, the Diameter server can transmit by itself a message to the AAA client if the Diameter server should indicate accounting information or connection termination in an NAS. Also, the Diameter server improves re-transmission and failure recovery functions and has a network recovery power much better than that of the weak and slow RADIUS server. In addition, the Diameter protocol is designed to provide a security technique between terminals that is not supported by the RADIUS protocol, and to support a next-generation extensible AAA such as that for roaming and mobile IP networks.

In the structure of the AAA protocol (Diameter protocol), a base protocol is basically disposed and application protocols are disposed on high level. The base protocol itself processes accounting and basically, real time accounting is a requirement. In the structure, if authentication of a user is completed, authorization is verified, and the result information is transferred to the terminal, accounting is processed and accounting information is periodically transferred to the AAA server.

Meanwhile, in the user authentication method, in order to support a variety of authentication methods, an access point (AP) uses an extensible authentication protocol (EAP) performing user authentication regardless of an authentication method provided by a service provider. Recently, the EAP has been gradually employed by all authentication methods such that the EAP is becoming a standard to provide an authentication framework between a user and an authentication server. Also, even when a new authentication algorithm emerges, a variety of authentication methods such as EAP-MD5, EAP-TLS, EAP-TTLS, EAP-SRP, and EAP-PEAP, can be accommodated. In addition, since a unified EAP in a wireless interval between a terminal and a network is supported, only by applying the EPA to designing a new wireless protocol, authentication can be performed appropriately enough.

On the other hand, though user authorization verification should be performed through direct interworking between a user terminal and an AAA server, it is not so in the real situation, and in many cases, authorization verification is omitted. This is because necessity of authorization verification is not recognized, and so far, even a format for verifying authorization has not been made.

Accordingly, authorization verification after authentication in the conventional AAA protocol is performed without a separate procedure, and in this structure, a desired service authority cannot be requested interworking with a subscriber in real time.

That is, authorization verification is performed immediately after the authentication, but definition of processing authorization verification itself has been unclear such that it is not too much to say that authorization verification has been actually omitted. Also, by some predetermined field values in application services, identical authorization verification has been performed for all users.

However, authorization setting for users becomes more diversified, and necessity for setting authorization for a variety of services from payment methods, to a desired service quality type of a user, an IP service type, privacy of a service to be used, and a security setting type is increasing, and therefore, the need to provide verification services for more diversified authorization is also increasing.

In order to meet this service environment, an authorization verification protocol should have a structure capable of satisfying the needs of users, that is, an extensible structure as in the authentication. That is, in the structure, authorization verification should be used with extensibility for various services newly expanding. Also, when a user requests service change even in the middle of receiving a service, authorization verification appropriate to the changed service should be able to be performed.

Accordingly, processing of authorization verification should be able to be appropriately connected to the AAA protocol together with an extensible authentication protocol in order to provide a variety of services in the future, and with respect to accounting, a network structure and protocol capable of processing detailed accounting information according to an agreed profile of a service authorization level are needed.

However, though the Diameter protocol currently being standardized has much flexibility in order to accommodate a variety of services, basic functions such as authentication, authorization verification and accounting, are performed as the base protocol.

When it is considered from the practical system's viewpoint, EAP-based authentication is performed to receive user services, but unlike the authentication, in the authorization verification, overload of the AAA server becomes an obstacle in enabling verification for various authorization. Accordingly, authorization verification is performed by separate specialized servers, and the MA server that should be connected to these servers takes more burden corresponding to the diversity of the connection protocols.

Accordingly, a structure which unifies authorization verification protocols and enables much more effective connection services between a terminal and the AAA server and even when a service with a new authorization level is added, can be interworked with a separate authorization verification server without the burden of upgrading the AAA server is needed.

SUMMARY OF THE INVENTION

The present invention provides a method for verifying authorization with extensibility in an AAA server capable of automatically performing an authorization verification function regardless of a variety of authorization verification methods required for a user service provided through a network.

According to an aspect of the present invention, there is provided a method for verifying authorization with extensibility in an authentication, authorization, and accounting (AAA) server including: the AAA server performing user authentication, transmitting the authentication result data to the user, and requesting authorization information for a subscriber service desired to be used, to the user; the user transferring an extensible authorization verification protocol framework having a predetermined format according to an AAA protocol to the AAA server, and requesting verification of the requested authorization; the AAA server verifying whether or not the authorization requested to be verified is set for the user, by referring to the framework; and if the authorization is verified, the AAA server transmitting the authorization verification result to the user, and by allocating a resource related to the authorization, beginning to provide the subscriber service.

The method may further include: if there is a request to change the verified authorization while the subscriber service is provided, re-verifying the authorization requested to be changed.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
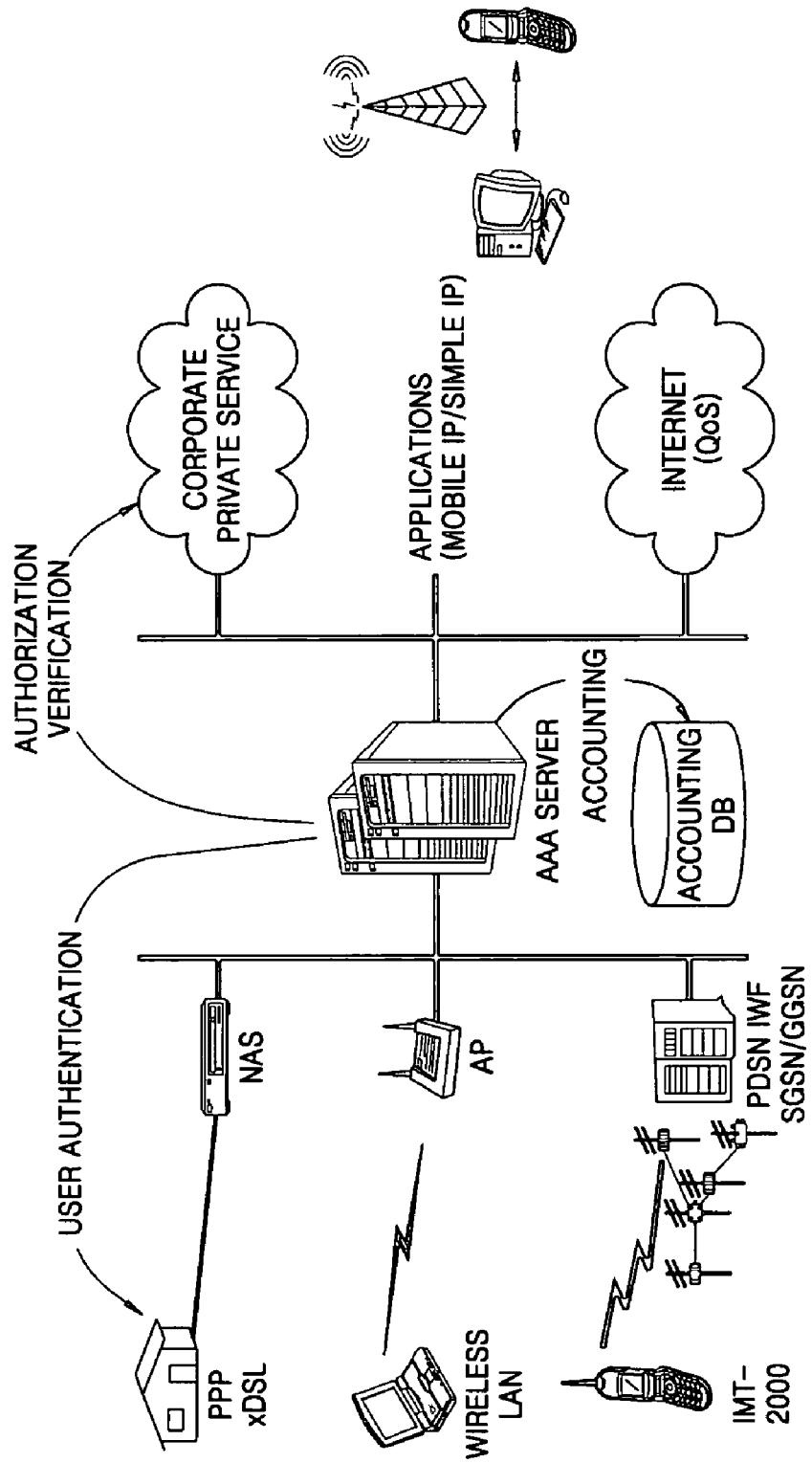
FIG. 1 illustrates the structure of a network of AAA processing.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, whenever the same element reappears in subsequent drawings, it is denoted by the same reference numeral.

For convenience of understanding, the main points of the present invention will now be explained first.

An authentication, authorization, and accounting (AAA) server performs authentication but should also perform verification of authorization requested by a subscriber.

Authorization verification information is to confirm authorization of using a variety of services connected to resources of a network of the subscriber and to specify a final service type, and relates to additional services. Since authorization for these additional services is closely related to accounting and this determines differentiated services and provider's profits, this should be treated importantly.

The core of technical ideas provided by the present invention is that after an authentication procedure is performed by an AAA server, in order to perform extensible authorization verification, a user (terminal) and the AAA server are interworking in real time and exchanging authorization related information with each other such that an authorization verification function can be provided.

Also, provided is an authorization verification function which can be extended to a variety of authorities in order to accommodate a variety of subscriber services, and which can process an authorization change request by a user even in the middle of providing services.

FIG. 1 illustrates the structure of a network of AAA processing. As shown in FIG. 1, services requiring the AAA include PPP access services, ADSL subscriber access services, WLAN subscriber access services, and in case of a network providing subscriber roaming services, network access services for a subscriber of another network, and authentication, authorization verification and accounting are performed each of these services.

In case where a service network is accessed through a variety of types of networks, if authentication of a subscriber is finished, an authorization verification procedure is performed. However, services for a user (subscriber) have all different purposes and the levels of services are also different. For example, even among subscribers of an identical ADSL service, the authority subscribed can be an ultra high-speed Internet connection for high grade subscribers, or an ultra high-speed Internet Light or a premium level. Also, there are WLAN subscribers, and even in the WLAN, there are a variety of types of services such as 802.11b, 11a, and 11g. In case of a VoIP subscriber, in order to provide the service, instead of the conventional Internet services, QoS should be guaranteed, and according to parameters such as latency, jitter bandwidth, and packet loss rate, different levels of services can be provided.

In addition, in case of mobile Internet services, there may be a subscriber who wants to use the environment of the home network even in the IP environment of a visited network, and there may also be a subscriber who wants to receive simple IP service that maintains only the Internet access type, not a mobile IP service in a visited network. Furthermore, since the processing cost of this mobile IP service is expensive, there may be a subscriber who does not always use the mobile IP service, and wants to use the simple IP service only for accessing the Internet when using the Internet after subscribing a service and ordinarily moving to another place, and use the mobile IP only when the service of the subscribing home network is needed.

Together with this variety of services, accounting can also be performed in a variety of ways for authorization verification of a subscriber, such as prepayment processing and post-payment processing. At this time, for the prepayment service and post-payment service, a subscriber may want different accounting with respect to a place and time of accessing the services.

By providing a framework of protocol (extensible authorization verification protocol) data verifying authorization levels that can handle all these cases, services of a subscriber having a variety of authorities to be provided in the future can be effectively provided. The present invention is provided for this purpose.

Figure 2:
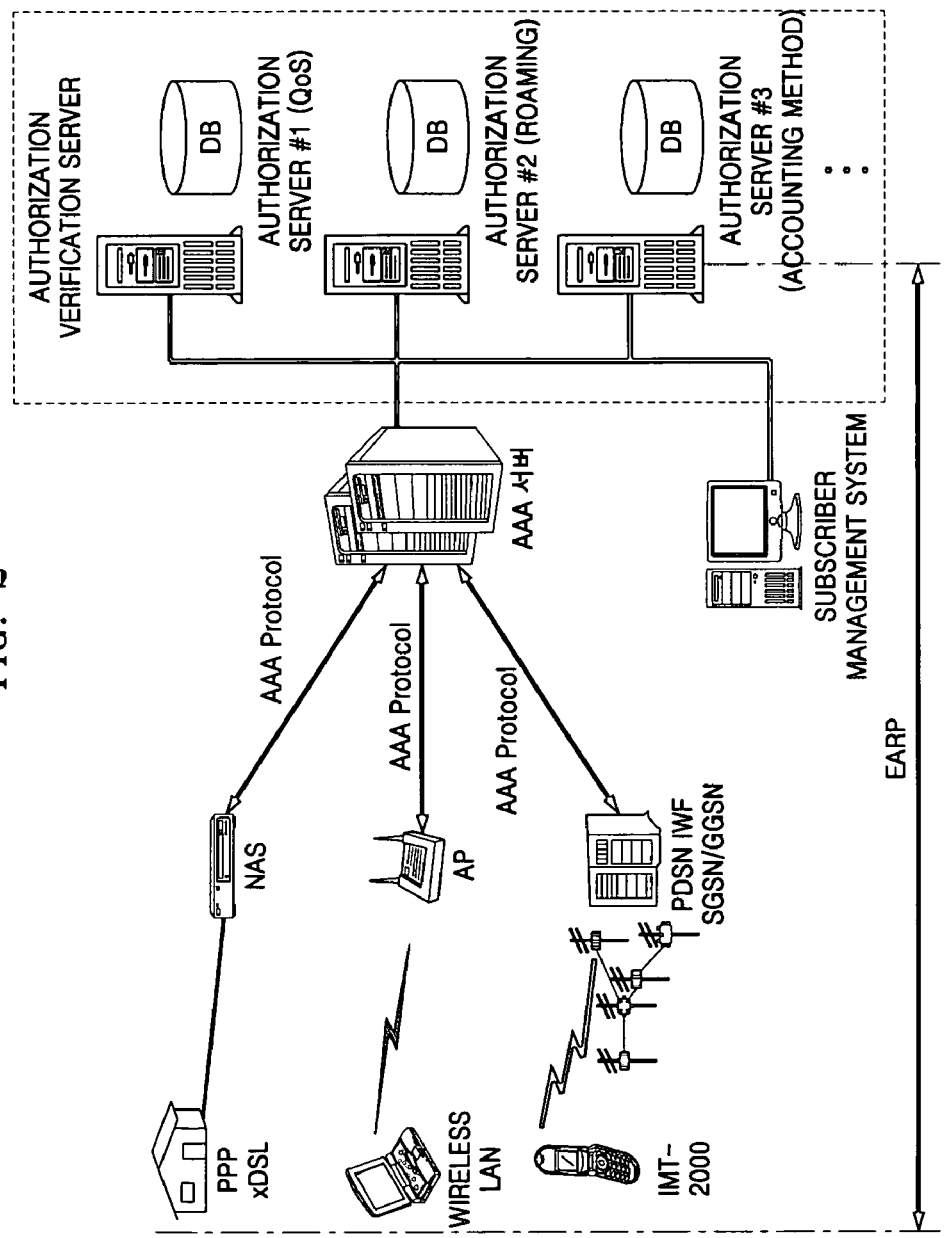
FIG. 2 illustrates an example of the structure of a network for authorization verification interworking with an AAA server.

FIG. 2 illustrates an example of the structure of a network for authorization verification interworking with an AAA server.

An extensible authorization verification protocol framework transmitted from a terminal according to an AAA protocol is transferred to an AAA server, and for this, the framework is formed to have a predetermined format and then transferred. Details of this format will be explained later. The AAA server identifies which authorization the user terminal requests, from the received extensible authorization verification protocol framework.

Next, through exchanging information with terminals according to respective authorization requests, procedures for authorization verification are performed. Exchange of information with a terminal is to interwork a variety of types of authorization verification with a unified authorization verification protocol, and is needed for re-verification of authorization when there is a change in the authorization in the future. The authorization verification server can be implemented in the AAA server itself, but it is preferable that the authorization verification server is implemented as a dedicated server (for example, a back-end type) separately from the AAA server, as shown in FIG. 2, to reduce the load of the AAA server.

Figure 3:
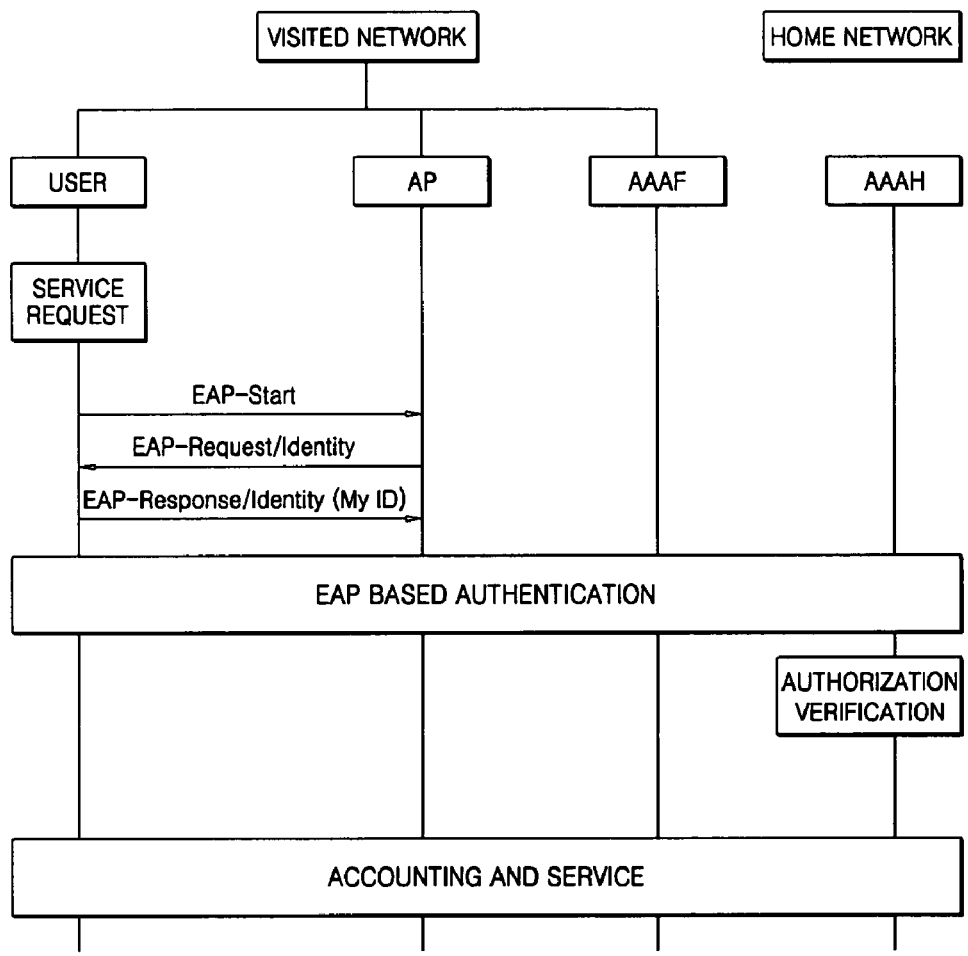
FIG. 3 is a diagram showing an AAA procedure defined in the conventional AAA (Diameter) protocol.

FIG. 3 is a diagram showing an AAA procedure defined in the conventional AAA (Diameter) protocol.

After authentication of a subscriber terminal, the AAA server performs authorization verification for the terminal, by determining by itself the authorization of the subscriber according to the subscription information of the subscriber without additionally exchanging information with the terminal. However, authorization verification was not performed practically, and accounting is performed directly after authentication verification.

There are some problems in the authorization verification according to the AAA procedure shown in FIG. 3. That is, the terminal transmits only authentication related information to the AAA server according to the extensible authentication protocol, and does not transmit authorization verification related information. Also, even though authorization verification is performed by using the AAA protocol between an AAA client and the AAA server, since the AAA client does not have authorization related information on the subscriber, it cannot be known in advance which authorization the subscriber requests. Since the requested authorization cannot be known, AAA processing should be performed including authorization verification elements for all possible cases, and this causes a lot of unnecessary loads. Also, even when the AAA server adds another authorization verification function, the AP cannot reflect this.

In addition, when authorization verification according to this AAA procedure is performed, since there is no exchange of related information with the user terminal requesting a service, the AAA server should know beforehand which authorization verification is required for the user. This is a fixed type authorization verification, in which by using the authorization at the time of initial subscription, the authorization of the subscriber is verified in a fixed way.

However, authorization becomes more diversified with diversifying services, as described above, and there may occur a need to change authority directly related to a charge in the middle of using a service. Accordingly, even though authorization verification is performed in real time, only when an extensible authorization verification protocol is applied, authorization verification for a variety of services in the future can be implemented.

Figure 4A:
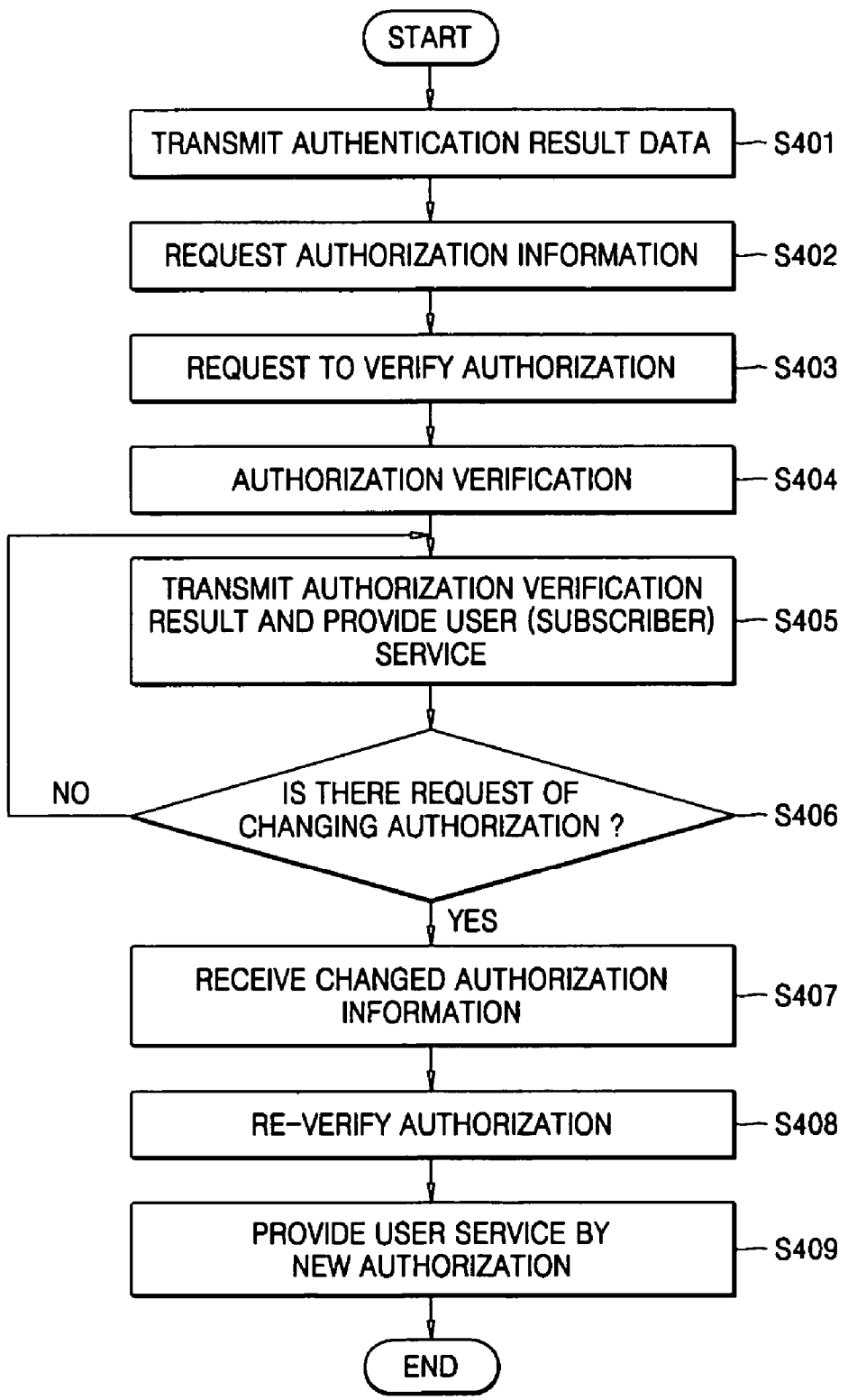
FIG. 4A is a flowchart of the operations performed by the present invention.
Figure 4B:
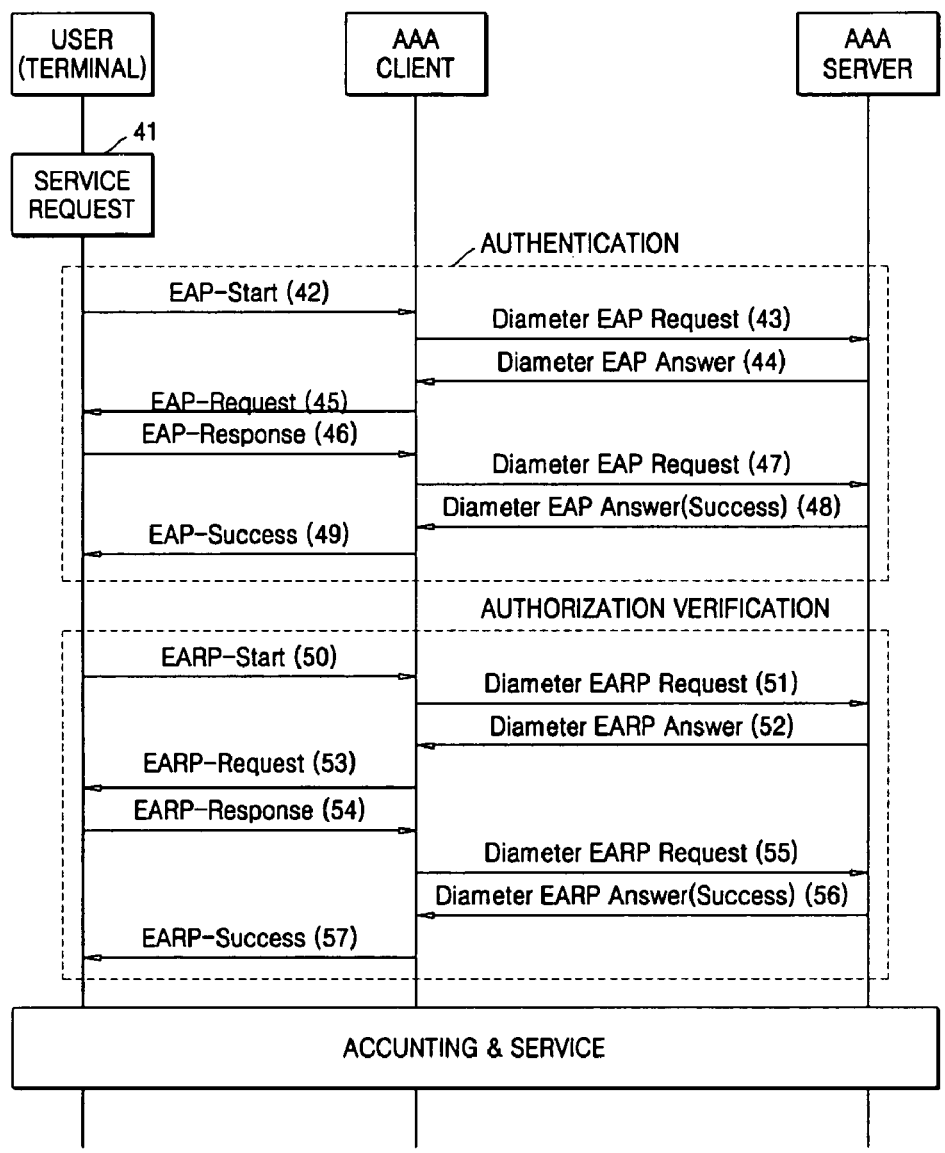
FIG. 4B is a diagram of the flow shown in FIG. 4A illustrated in detail in relation to a process using an extensible authorization verification protocol.

FIG. 4A is a flowchart of the operations performed by the present invention, and FIG. 4B is a diagram of the flow shown in FIG. 4A illustrated in detail in relation to a process using an extensible authorization verification protocol.

An authentication procedure 41 through 49 and authorization verification procedure 50 through 57 according to the present invention will now be explained.

A user (end user, subscriber) requests access to a network by requesting a subscriber service (SERVICE REQUEST) 41, and transfers an extensible authentication protocol framework (authentication information of the user) to an AAA client (EAP-Start) 42.

The AAA client receives the extensible authentication protocol framework and transfers it to the AAA server (Diameter EAP Request) 43.

The AAA server performs an authentication procedure by using the extensible authentication protocol, generates data related to the reason for a success or failure of the user authentication, and transmits the data to the AAA client (Diameter EAP Answer) 44.

If the authentication is failed because of invalid user data, the AAA client requests the user to re-transmit the authentication information (EAP-Request) 45.

The user re-transmits the user authentication information to the AAA client (EAP-Response) 46.

The AAA client receives the extensible authentication protocol framework and again transfers it to the AAA server (Diameter EAP Request) 47. The operations 42 through 47 are repeatedly performed until the authentication is successful.

If the user data is valid and the authentication is successful, the AAA server transmits authentication success result information to the AAA client. At this time, a request to transmit authorization information may be transmitted together (Diameter EAP Answer(Success)) 48.

As the AAA client transmits the authentication success result information to the user, the authentication procedure is completed (EAP-Answer) 49. The operations 41 through 49 are performed according to the EAP provided by the AAA protocol, and operations S401 and S402 of FIG. 4A are implemented through operations 41 through 49.

Thus, if the authentication procedure is finished, the authorization verification procedure S403 through S405 begins in earnest.

The next scenario is related to present invention that is uniformly performing an authorization framework regardless of a variety of authorization verification methods required for a user service provided through a network. The present invention is a framework for verifying authorization with extensibility. Such as extensible authentication protocol, EARP(Extensible AuthoRization Protocol) provide general protocol platform for authorization protocol between user and AAA server.

The user receives the authentication success result information, sets authorization for a service desired to use, and by transferring authorization related information (an extensible authorization verification protocol framework) to the AAA client, requests authorization verification (EARP-Start) 50. At this time, the framework has a predetermined format, and the authorization verification is requested including session information that can be mapped into basic information (Identity) for processing authorization verification. Also, in case of service authorization for VoIP and the like, since authorization can be set according to a calling number and a called number, this additional information should be transmitted together. In case of VoIP, service quality information may also be transmitted together.

The AAA client transfers the extensible authorization verification protocol framework transmitted by the user, to the AAA server (Diameter EARP Request) 51. At this time, if security should be maintained, extensible authentication information can also be encrypted by using a security key generated during the authentication procedure. Basically, by using an authenticator, message authentication should be performed and by using an Identifier field, whether the request and response correspond exactly should also be confirmed. In addition, if the verification is for additional authorization using a card, the AAA server should permit a time for the user to input the information. Also, for this card information, a security function should be activated so that the information can be transferred safely.

The AAA server confirms the received extensible authorization verification protocol framework, and transfers the processing of the authorization verification to an authorization verification dedicated server, or directly performs the authorization verification by itself. At this time, in order to prepare a case where the authorization is changed, for example, when there is more information to be negotiated with the subscriber, related information is continuously exchanged between the terminal and the AAA server in real time.

The AAA server generates data related to the reason for a success or failure of the authorization requested by the user for verification, and transmits the data to the AAA client (Diameter EARP Answer) 52.

If the authorization verification is failed, the AAA client requests the user to re-transmit the extensible authorization verification protocol framework (EARP-Request) 53.

The user re-transmits the extensible authorization verification protocol framework to the AAA client (EARP-Response) 54.

The AAA client receives the extensible authorization verification protocol framework, and again transfers it to the AAA server (Diameter EAP Request) 55. The operations 51 through 55 are repeatedly performed until the verification is successful.

If the authorization verification is successful, the AAA server transmits the verification success result information to the AAA client (Diameter EARP Answer(Success)) 56.

As the AAA client transmits the verification success result information to the user, the authorization verification procedure is completed (EARP-Success) 57, and by allocating resources corresponding to the authorization to the user, the subscriber services begins to be provided. The operations S403 and S404 of FIG. 4A are implemented by the operations 50 through 57.

Meanwhile, while receiving the corresponding subscriber service, the user (terminal) can request change of the subscriber service in operation S406. Also, changed accounting according to the authorization of the corresponding service should accompany the change.

A process by which authorization verification is performed when there is a request to change the authorization (subscriber service) while the service is being provided will now be explained.

While a service is being provided, the subscriber may request to change the authorization, or in some case, when an allocated resource cannot be continuously provided because of shortage of system resources that a network is to service, an already allocated authority may have to be changed.

In order to handle these cases, as described above, by exchanging an extensible authorization verification protocol framework between the terminal and the AAA server in real time, a message for resetting authorization should be communicated between the user and the AAA server.

When the subscriber requests to change the authorization, the AAA server receives a changed extensible authorization verification protocol framework in operation S407, and re-verifies the authorization requested to be changed in operation S408. When a resource should be changed in a service network, authorization change can be requested by the server to the terminal.

While the AAA server performs verification of the authorization requested to be changed, if there is information further required to the user, the AAA server requests the data additionally, receives the data, verifies the authorization, generates changed authorization verification result information, and transmits the information to the AAA client.

The AAA client transmits the changed authorization verification result information to the terminal and indicates that the authorization requested by the user to be changed is verified. If the verification is successful, a corresponding session is again set and a user service based on the new authorization is provided in operation S409.

Figures 5A, 5B:
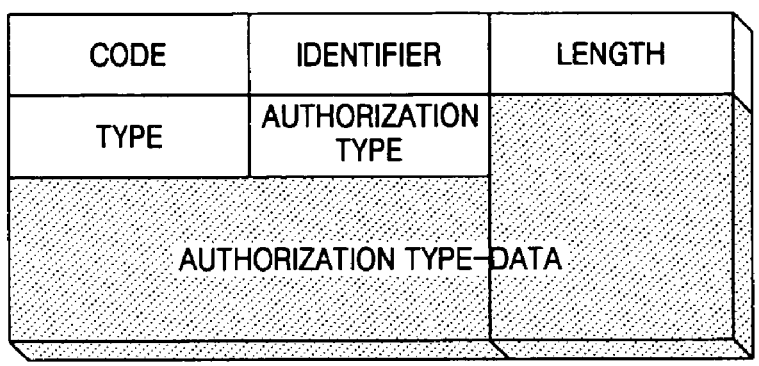
FIGS. 5A and 5B illustrates an example of a format of an extensible authorization verification protocol framework requested to process an extensible authorization verification protocol.

FIGS. 5A and 5B illustrates an example of a format of an extensible authorization verification protocol framework requested to process an extensible authorization verification protocol.

When a protocol such as a WLAN protocol is used, in the format of an extensible authorization verification protocol data framework as shown in FIG. 5A, a Code field, an Identifier field, and a Length field are placed first. These three fields are a framework provided by the EAP, and the extensible authorization verification protocol (EARP) according to the present invention enables compatibility with the EAP.

After the three fields, a Type field is placed in order to distinguish it from an authentication framework. The type field is used to specify the purpose of data included in the framework, and, for example, if the type of data is for 'authorization verification', as shown in FIG. 5B, a code value for 'authorization verification' is set to 100.

The field next to the Type field is one for specifying an authorization type (Authorization Type), and indicates more specifically the type of a subscriber service desired to be used by the user. Examples of codes according to types are shown at the bottom part of FIG. 5B. In the field next to the Authorization Type field, specific data for authorization verification, that is, authorization related information, is inserted.

The AAA server receives the extensible authorization verification protocol data framework having the format described above transmitted by the AAA client, determines from the Type field whether the user requests 'authentication' or 'authority verification', and determines from the Authorization Type field, the type of authorization, that is, the type of a subscriber service desired to be used by the user.

Also, as described above, since the MA server continuously exchanges the extensible authorization verification protocol framework with the user (terminal) in real time, even if the authorization changes in the middle of providing the user service, the change is directly reflected in the Type field and the Authorization Type field such that authorization verification can be performed in real time.

As described above, according to the present invention, by verifying authorization in an extensible structure, when a new authorization verification type and service should be introduced, the authorization verification can be performed with identical equipment without upgrading the conventional equipment between the terminal and the network, and the impact of a network termination apparatus such as a terminal and an AP can be minimized.

In addition, after a network is accessed, application services through authorization control of all services are enabled, and by setting a variety of service levels, the service can be allocated to a subscriber. Also, by providing information to a subscriber, a request of the subscriber is linked to the service environment in real time and a service tightly connected to the request of the subscriber is enabled.

Furthermore, even when service is provided in real time, the authorization can be changed according to a request to change the authorization by the subscriber, and an improved service can be provided through a user's approval on information required for hand-off processing. Also, a customized service satisfying the need of a subscriber can be provided.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method for verifying authorization with extensibility in an authentication, authorization, and accounting (AAA) server comprising:
   the AAA server performing user authentication, transmitting the authentication result data to the user, and requesting authorization information for a subscriber service desired to be used, to the user;
   the user transferring an extensible authorization verification protocol (EARP) framework having a predetermined format, according to an AAA protocol, to the AAA server, and requesting verification of the requested authorization;
   the AAA server verifying whether or not the authorization requested to be verified is set for the user, by referring to the framework;
   wherein the predetermined format is formed by adding a first field specifying whether data included in the framework is for 'authorization verification' and adding a second field specifying the type of the specified authorization if 'authorization verification' is specified in the first field of the extensible authentication verification protocol (EARP) field for authorization, the first and second fields are added to the former format of a framework proposed by an extensible authentication protocol (EAP) to form the EARP framework having the predetermined format; and
   if the authorization is verified, the AAA server transmitting the authorization verification result to the user, and by allocating a resource related to the authorization, beginning to provide the subscriber service.

2. The method of claim 1, further comprising:
   if there is a request to change the verified authorization while the subscriber service is provided, re-verifying the authorization requested to be changed.

3. The method of claim 2, wherein the re-verifying of the authorization comprises:
   determining whether or not there is a request to change the verified authorization;
   if there is the request to change, receiving a changed extensible authorization verification protocol framework having the predetermined format, from the user; and
   determining the authorization requested to be changed, from the changed framework, re-verifying the authorization, and providing the user service according to the re-verified authorization.

4. The method of any one of claims 2 through 3, wherein the AAA server and the user continuously exchange the framework and information related to the request to change the authorization is reflected in the two fields such that implementation of the authorization verification in real time is enabled.

5. The method of claim 1, wherein the verification or the re-verification is transferred by the AAA server to a verification or re-verification dedicated server disposed separately, and performed by the dedicated server such that the load on the AAA server is reduced.

* * * * *